Oct. 4, 1949.  R. LE R. HART  2,483,767
SOIL PULVERIZER
Filed April 20, 1945  4 Sheets-Sheet 1

Inventor
Robert LeRoy Hart,
By Clarence A. O'Brien
and Harvey B. Jacobson
Attorneys Oct. 4, 1949.         R. LE R. HART         2,483,767
                      SOIL PULVERIZER
Filed April 20, 1945                    4 Sheets-Sheet 3

Inventor
Robert LeRoy Hart,

By *Clarence A. O'Brien*
and *Harvey B. Jacobson*
Attorneys

Inventor
Robert LeRoy Hart,

Patented Oct. 4, 1949

2,483,767

UNITED STATES PATENT OFFICE 2,483,767

SOIL PULVERIZER

Robert Le Roy Hart, Smithfield, N. C.

Application April 20, 1945, Serial No. 589,340

4 Claims. (Cl. 97—38)

This invention relates to agricultural implements and has for an object to provide a machine with which tillable land may be quickly and thoroughly pulverized.

Another object of the invention is to provide a machine having rotors provided with a series of peripheral blades.

A further object of the invention is to provide a soil pulverizing machine comprising a series of rotors arranged in stepped relation and having a series of spaced and inclined peripheral blades for chopping into the soil.

Other features and advantages will become more readily apparent from the following description and the accompanying illustrative drawings in which.

Figure 1:
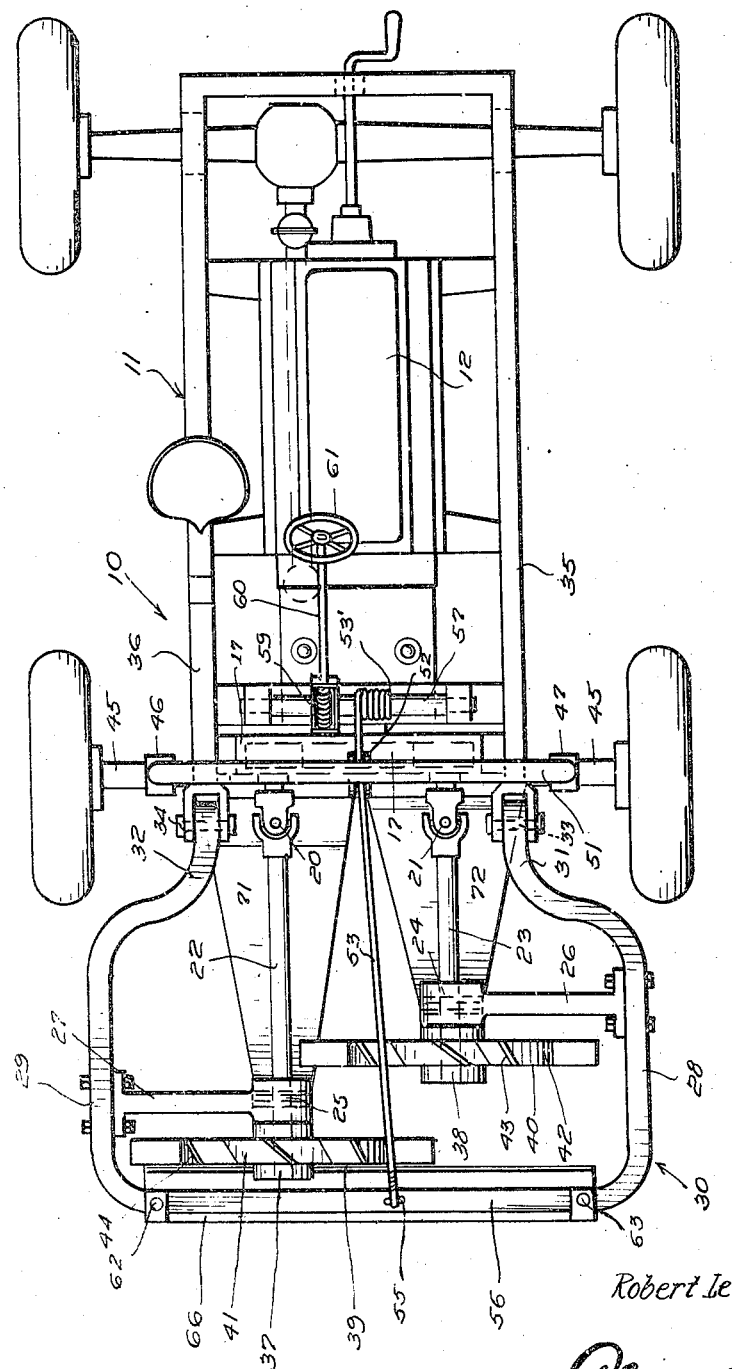
Figure 1 is a top plan view of my machine.
Figure 2:
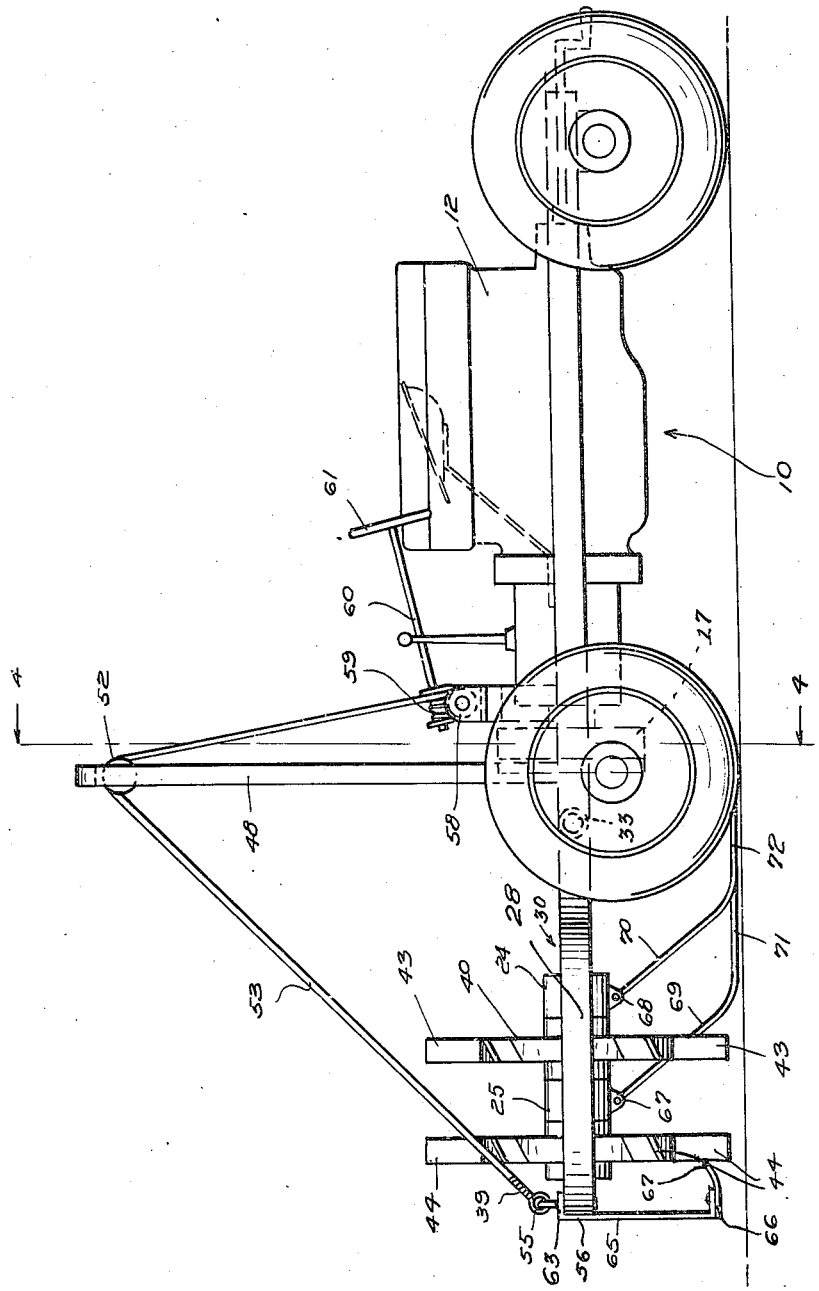
Figure 2 is a side elevation thereof.
Figure 3:
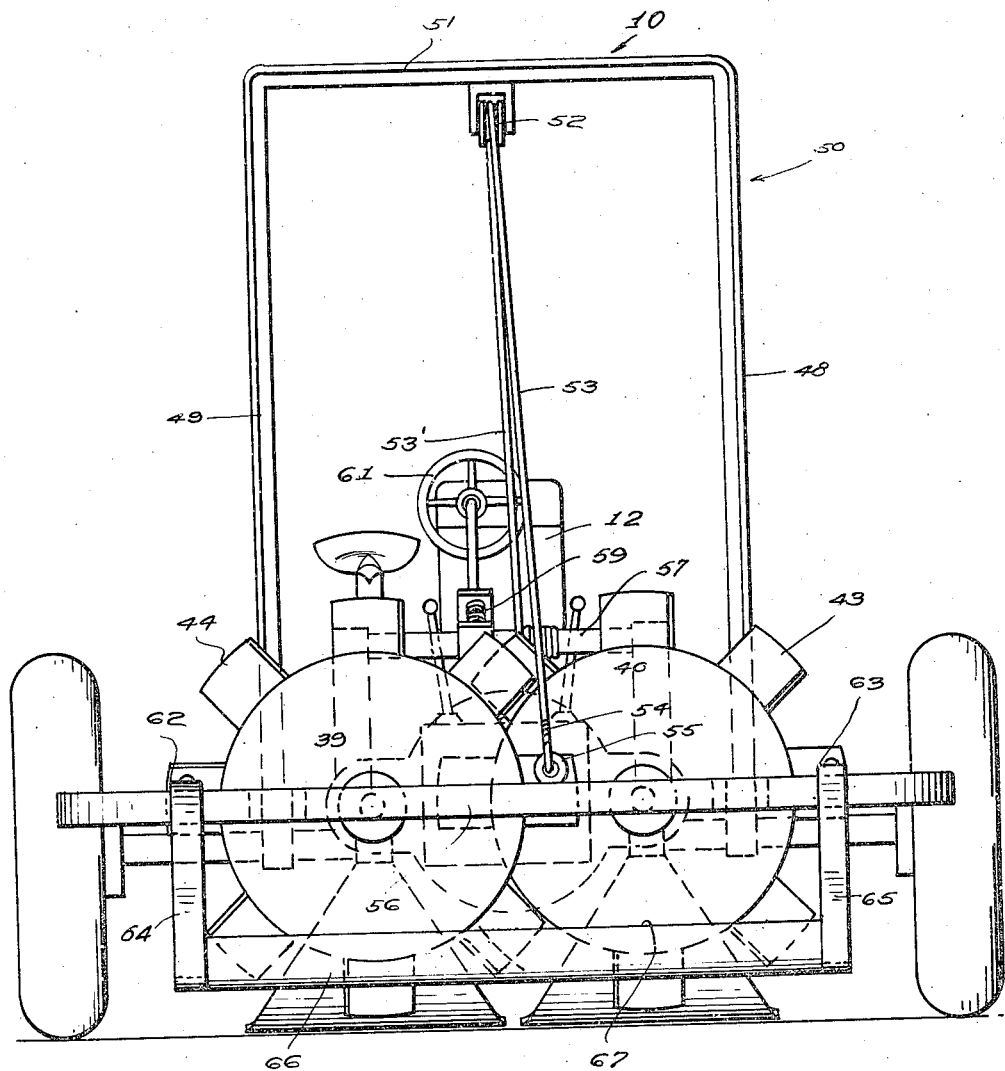
Figure 3 is a front elevational view of the device.
Figure 4:
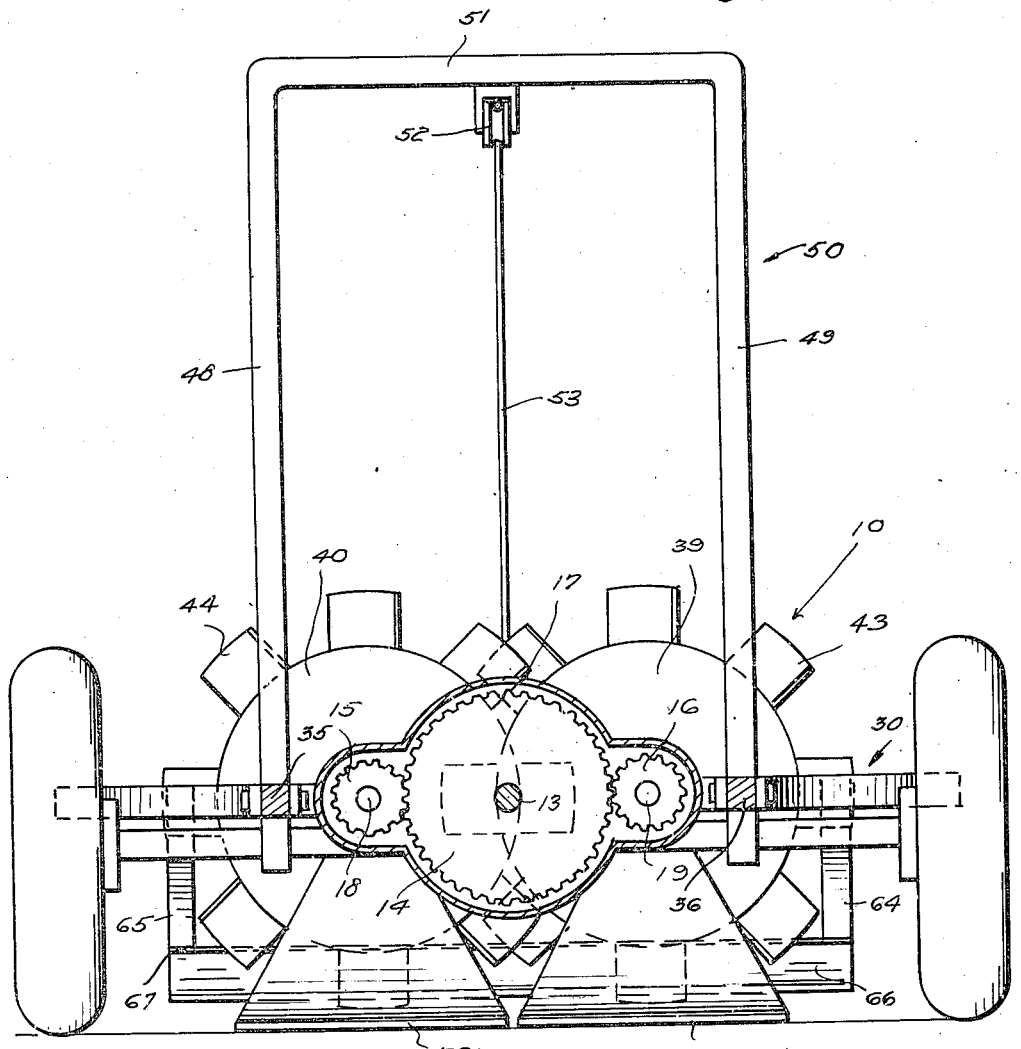
Figure 4 is a sectional view taken on line 4—4 of Figure 2.

Like reference characters in the views of the drawings and in the specification indicate like parts. The character 10, designates my machine which includes a tractor 11, provided with a motor 12, to the shaft 13, of which is keyed a relatively very large gear 14, meshing with two relatively smaller gears 15 and 16, disposed on opposite sides of the gear 14, all of which gears being enclosed in a housing 17. The gears 15 and 16, are keyed on stub shafts 18 and 19, respectively, which through universal joints 20 and 21, are connected to shafts 22 and 23, supported in bearings 24 and 25, carried on brackets 26 and 27, fixed to the side bars 28 and 29, of a frame 30, attached at its inner ends 31 and 32, by hinges 33 and 34, to the forward ends of the chassis frame members 35 and 36.

To the forward ends 37 and 38, of the shafts 22 and 23, are keyed relatively large (in diameter) rotors 39 and 40, around the peripheries 41 and 42, of which are a series of spaced apart inclined cutter blades 43 and 44. The shafts 22 and 23, are so spaced apart and of such varying lengths that the said rotors are in stepped relation and overlap one another.

Fixed to the housing 45, of the front axle of the tractor, as at 46 and 47, are the lower ends of the arms 48 and 49, of an inverted U-shaped frame 50, and to the center of the cross head 51, thereof is secured a pulley wheel 52, over which is threaded a cable 53, one end 54, of which is attached to an eye 55, on the center of the front bar 56, of frame 30. The other end 53', of the cable is attached to a windlass 57, on which is fixed a worm gear 58, driven by a worm 59, on a shaft 60, operated by a hand wheel 61, whereby the frame 30, and its attachments may be raised out of the way when not in use or for passing over obstacles.

From the opposite ends of the member 56, are fixed at 62, and 63, the upper ends of depending legs 64 and 65, to the lower ends of which is fixed an elongated shoe 66, the rear edge 67, of which is curved up, which is slidable on the ground and forms a depth gauge to limit the depth to which the blades may cut into the ground. This shoe also in sliding over the ground surface mashes down stubble, weeds, etc. ahead of the cutting blades, whereby the same is in better position for chopping by the blades.

Attached to the under side of the bearings 24 and 25, are the upper ends 67 and 68, of pivoted arms 69 and 70, to the lower ends of which are attached gradually widening pans 71 and 72, which are dragged behind the rotors 39 and 40, to lay the dust created thereby.

Figure 5:
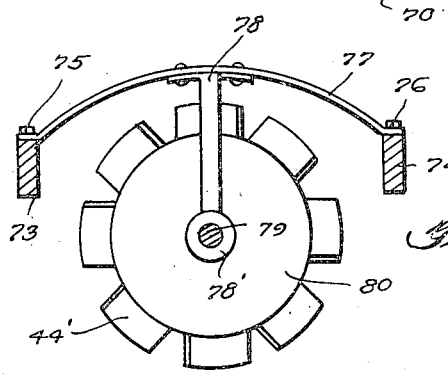
Figure 5 is a fragmentary view illustrating a modification.

In Figure 5, I show a slight modification of rotor shaft supports and in which 73 and 74, are the side bars of the hinged frame of the machine, to which bars are fixed the ends 75 and 76 of a bow-shaped guard 77, from which depends a hanger 78, to the lower end of which is carried a bearing 78', for the forward end of shaft 79, upon which the rotor 80, is fixed.

From the foregoing it will be seen that the motor 12, drives gear 14, which in turn drives the small gears 15 and 16, at great speed and with the shafts 18 and 19, and their rotors turning their blades 43 and 44, to cut into the ground in very rapid succession, breaking the same into fine or pulverized condition and thus forming an excellent seed bed. As the combined width of the two rotors is considerable a very wide swath is cut as the machine passes over the ground, thus with one operation doing the work of a considerable number of plows as well as subsequent disking and harrowing, saving much labor, time and fuel.

It is thought that persons skilled in the art to which the invention relates will be able to obtain a clear understanding of the invention after considering the description in connection with the drawings. Therefore, a more lengthy description is regarded as unnecessary.

Minor changes in shape, size and rearrangement of details and parts such as come within the purview of the invention claimed may be resorted to, in actual practice, if desired.

Having now described my invention that which I claim as new and desire to procure by Letters Patent is:

1. A soil pulverizing device comprising a tractor, a frame hingedly secured to the forward end thereof, a plurality of coplanar shafts of varied length, rotors mounted on said shaft and within said frame, gears driven by the motor of said tractor and said shafts rotated by said gears thereby causing the rotation of said rotors, means mounted on said tractor and operatively connected to said frame for raising and lowering said frame, and baffle means extending across said frame for limiting pivotal travel of said frame.

2. A soil pulverizing device comprising a tractor, a frame hingedly secured to the forward end thereof, a plurality of shafts of varied length, rotors mounted at the terminal portions of said shafts, a predetermined rotor having a portion thereof overlapping the next adjacent rotor, gears driven by the motor of said tractor and said shafts rotated by said gears, means mounted on said tractor and operatively connected to said frame for raising and lowering said frame, an arcuate baffle extending across said frame engageable with the ground for limiting pivotal travel of said frame, and baffle means secured to said frame behind said rotors for leveling pulverized soil and for allaying dust.

3. A soil pulverizing device comprising a tractor, a frame hingedly secured thereto, coplanar rotatable means secured to said frame, means for rotating said rotatable means, rotors secured to said rotatable means, one of said rotors positioned behind and partially overlapping the next adjacent rotor, a rod secured to said tractor and a winch secured adjacent said rod, a cable secured to said frame, traveling over said rod and secured to said winch for selectively lifting said frame, and baffle means pivoted to said frame behind said rotors.

4. A soil pulverizing device for use on a tractor, a frame, means for pivotally securing said frame to said tractor, coplanar brackets positioned within said frame, shafts journaled in said brackets and substantially parallel to said frame, pivotal means for securing said shafts to said tractor, soil pulverizing means secured to said shafts, said soil pulverizing means including partially overlapping rotors, arcuate baffle means secured to said frame for limiting the pivotal travel thereof, and baffles pivotally secured to said brackets and extending longitudinally of said shafts.

ROBERT Le ROY HART.

REFERENCES CITED

The following references are of record in the file of this patent:

UNITED STATES PATENTS

| Number | Name | Date |
|---|---|---|
| 28,687 | Pomeroy | June 12, 1860 |
| 1,277,780 | Townsend | Sept. 3, 1918 |
| 1,619,797 | Martikainen | Mar. 1, 1927 |
| 1,828,615 | Pearce | Oct. 20, 1931 |
| 2,182,157 | McDermott | Dec. 5, 1939 |
| 2,250,391 | Ober | July 22, 1941 |

FOREIGN PATENTS

| Number | Country | Date |
|---|---|---|
| 91,473 | Germany | May 5, 1897 |